United States Patent [19]

Bell

[11] Patent Number: 4,491,399
[45] Date of Patent: Jan. 1, 1985

[54] METHOD AND APPARATUS FOR RECORDING A DIGITAL SIGNAL ON MOTION PICTURE FILM

[75] Inventor: Steven A. Bell, Venice, Calif.

[73] Assignee: Coherent Communications, Inc., Sylmar, Calif.

[21] Appl. No.: 511,522

[22] Filed: Jul. 7, 1983

Related U.S. Application Data

[63] Continuation-in-part of Ser. No. 424,840, Sep. 27, 1982, abandoned.

[51] Int. Cl.³ .............................................. G03B 17/24
[52] U.S. Cl. ........................................ 352/92; 352/12; 354/105; 346/20; 346/107 A; 346/108
[58] Field of Search .................... 352/12, 84, 92, 236; 354/105, 104; 346/107 A, 108, 20, 23

[56] References Cited

U.S. PATENT DOCUMENTS

| | | | |
|---|---|---|---|
| 3,309,463 | 3/1967 | Roedl | 178/69.5 |
| 3,601,537 | 8/1971 | Gueldenpfenning et al. | 375/113 |
| 3,603,974 | 9/1971 | Copeland, Jr. | 352/84 X |
| 3,671,112 | 6/1972 | Lennert et al. | 352/92 X |
| 3,678,200 | 7/1972 | Clark | 178/69.5 R |
| 3,752,958 | 8/1973 | Gilberg et al. | 235/61.11 E |
| 3,826,566 | 7/1974 | Csontos | 352/12 |
| 4,027,243 | 5/1977 | Stackhouse et al. | 325/53 |
| 4,150,882 | 4/1979 | Konick | 352/236 X |

Primary Examiner—L. T. Hix
Assistant Examiner—Della J. Rutledge
Attorney, Agent, or Firm—Pretty, Schroeder, Brueggemann & Clark

[57] ABSTRACT

A method and apparatus for recording a digital signal such as a modified SMPTE time code on motion picture film as it is being intermittently advanced by a motion picture camera. The recorded time code includes a set of timing bits followed immediately by a set of synchronization bits. In one embodiment, the time code is recorded as a continuous signal with the last bit recorded for each frame having an extended length, to ensure that uncertainties in the specific times at which the camera begins and ends its advancement of the film don't result in the recording of a bit that is shorter than a nominal bit duration. In a second embodiment, an addition set of synchronization bits is recorded at the beginning of each frame, so that a time code reader assumes it corresponds to the previous frame and properly decodes the following sets of timing bits and synchronization bits as corresponding to the current frame.

34 Claims, 23 Drawing Figures

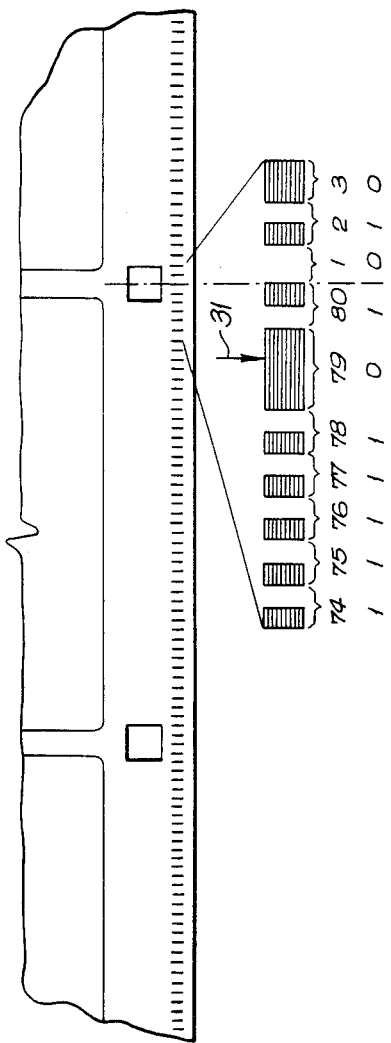
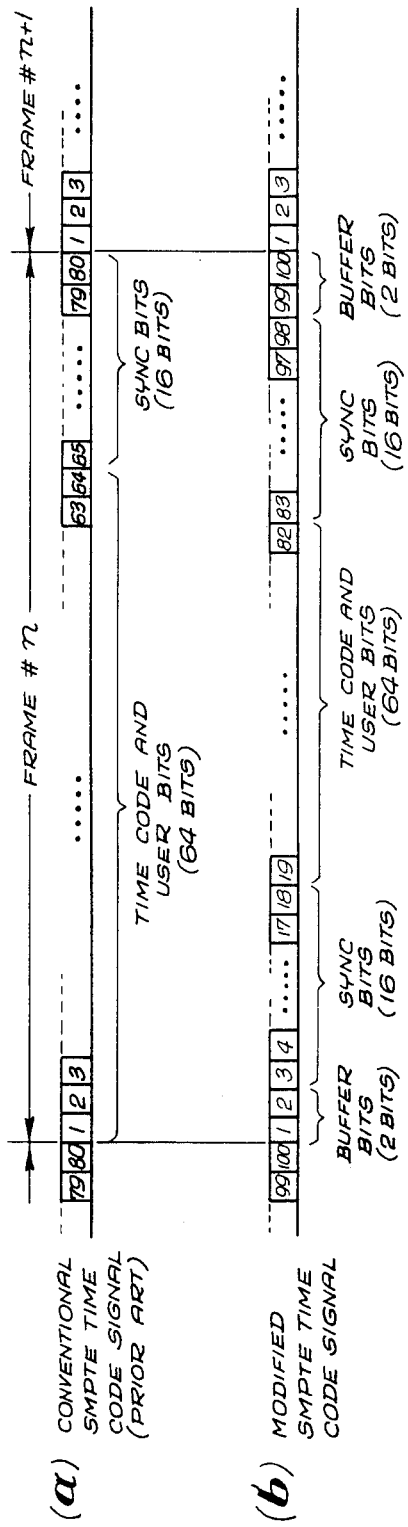

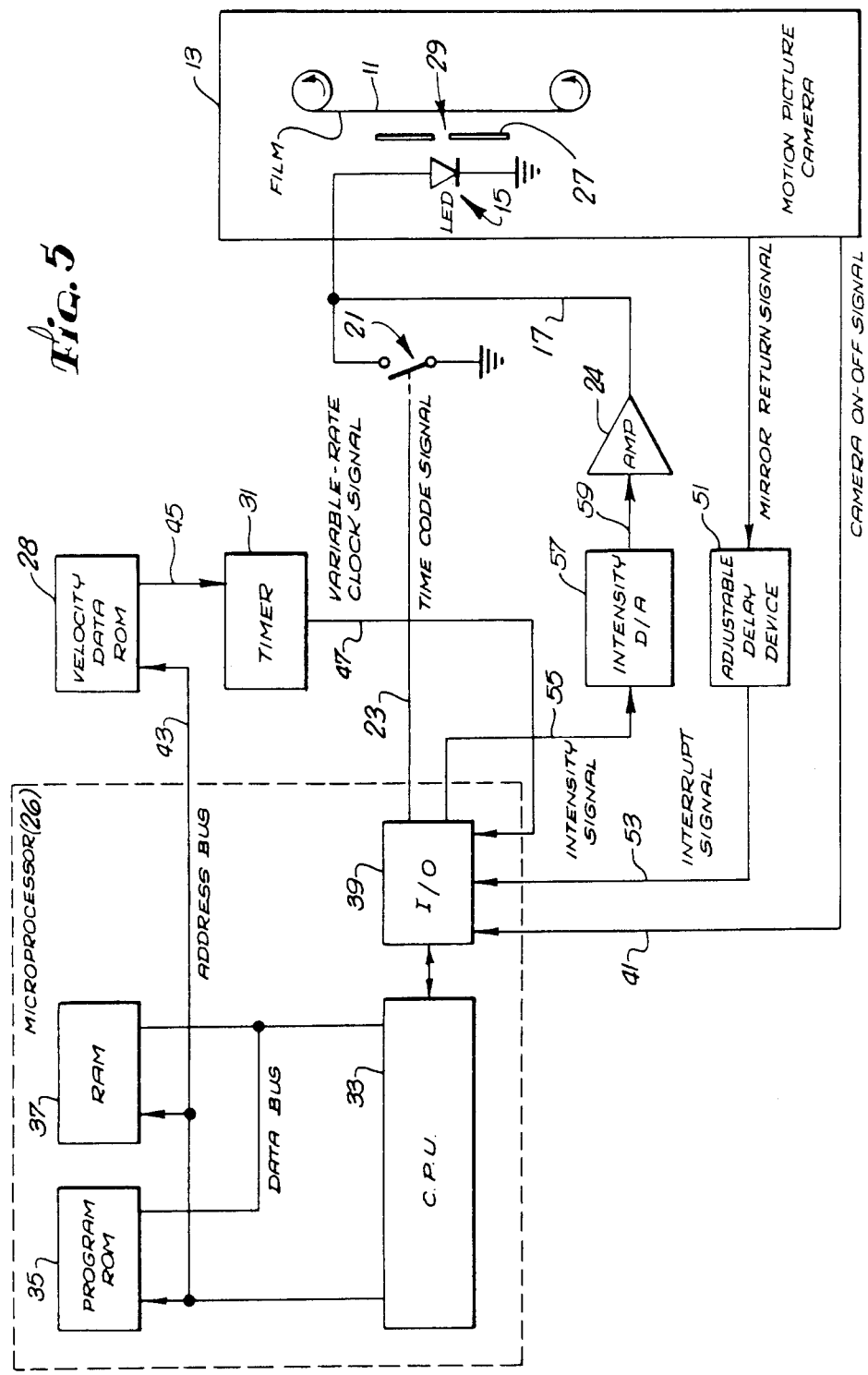

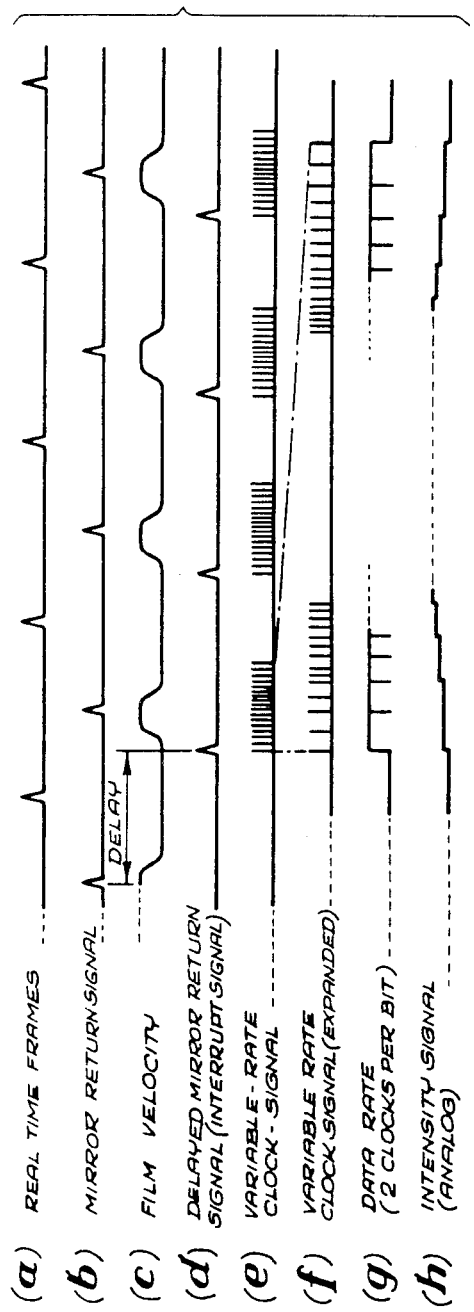

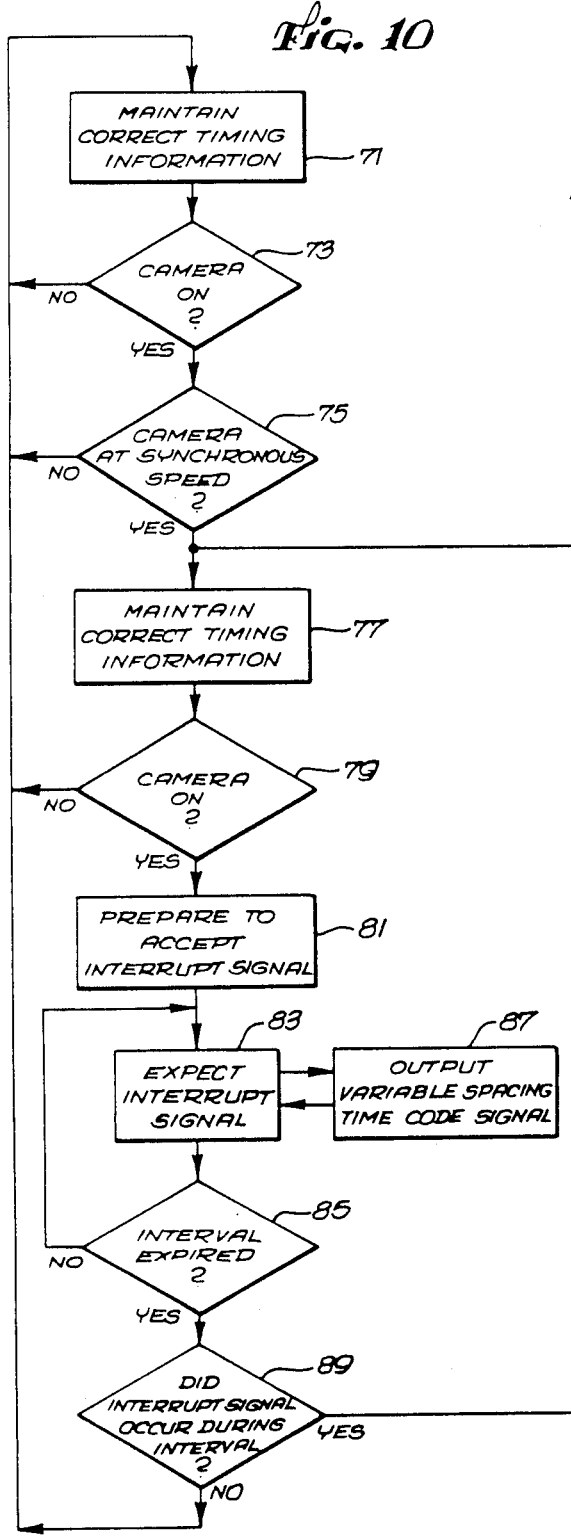
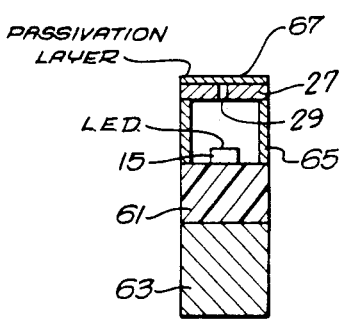
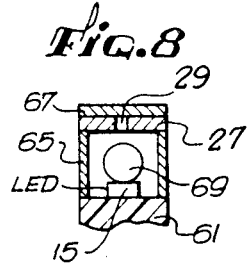
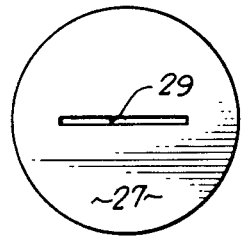

METHOD AND APPARATUS FOR RECORDING A DIGITAL SIGNAL ON MOTION PICTURE FILM

This is a continuation-in-part of application Ser. No. 424,840, filed Sept. 27, 1982, and now abandoned.

BACKGROUND OF THE INVENTION

This invention relates generally to systems for recording signals on motion picture film, and, more particularly, to systems for recording a digital signal on such film while it is being intermittently advanced by a motion picture camera.

Motion picture film editing normally requires the accurate synchronization of motion picture film with an accompanying sound recording. The film can come from several different cameras operating simultaneously, and the sound recording can include a number of tracks for dialogue, music and appropriate sound effects. It is ordinarily essential that all of the film and sound tracks be arranged in precise synchronization with each other.

Synchronization is relatively easy when editing video tape, as contrasted with motion picture film, because a time code signal can be recorded in a separate time code channel adjacent an edge of the tape. Knowing the exact time at which a particular video frame was recorded makes it relatively easy to synchronize it with other video and audio tapes that record similar time code signals.

Editing motion picture film, on the other hand, has generally been more difficult, because devices have not been available for recording such time code signals on the film. Generally, the film has been synchronized with the various sound tracks by means of a clapstick and its resulting sharp noise. It is believed that one reason such time code signals have not been recorded on motion picture film is that the precise times at which the intermittent frame advancement begins and ends are somewhat variable. Although the magnitude of this variability is typically less than about one percent, this is nevertheless considered to be significant.

It has generally been thought to be impractical to record a continuous digital time code on the film, such as the conventional time code specified by the Society of Motion Picture and Television Engineers (SMPTE), which includes 64 timing and user bits and 16 synchronization bits for each picture frame. This is because such a recording might result in the loss of bits at the beginning and ending of each recording sequence caused by uncertainties in the specific times at which the intermittent frame advancement begins and ends. A conventional SMPTE time code reader therefore could not properly decode the bits to determine the timing of the corresponding picture frames and to determine other user information included in each 80-bit word.

It should therefore be appreciated that there is a need for a system that can record a digital signal such as an SMPTE time code on motion picture film such that the recorded signal can be decoded by a conventional time code reader even though the first and last bits associated with each picture frame might be missing or otherwise defective. The present invention fulfills this need.

SUMMARY OF THE INVENTION

The present invention is embodied in an apparatus and related method for recording a digital signal on motion picture film, while a motion picture camera is advancing the film intermittently a distance of one frame spacing. The precise times at which the intermittent frame advancement begins and ends are variable. The apparatus includes transducer means disposed adjacent the film and digital signal means for coupling a prescribed sequence of digital bits to the transducer means whenever the camera advances the film. In accordance with the invention, the successive sequences of digital bits coupled by the digital signal means are specially formatted such that the signal actually recorded on the film can be readily decoded by a conventional playback device as though it were recorded as a continuous digital signal on the film.

In a first embodiment of the invention, the digital signal means adjusts the durations of the bits in each bit sequence such that the last bit recorded on the film has a length longer than the nominal lengths of the remaining bits recorded in the sequence, thereby ensuring that the variability in the precise times at which the intermittent frame advancement begins and ends does not result in the recording of a bit that is shorter than a nominal bit duration. More particularly, when an SMPTE time code is being recorded, the last bit in each recording sequence is the seventy ninth bit of the 80 bit word. The digital signal means adjusts its duration such that it is recorded with a length substantially the same as the lengths of the preceding bits. However, at the beginning of the recording sequence for the next picture frame, a portion of the preceding seventy ninth bit is recorded again, after which the eightieth bit is recorded and then the first 79 bits of the next 80-bit word. What results is the recording of a continuous digital signal having 80 bits associated with each picture frame and having one bit in each grouping of 80 with an extended length. Since the SMPTE time code is a diphase Manchester signal, with the seventy ninth bit always having no transition at its midpoint, this ensures that the bit recorded at the ending of one bit sequence and the beginning of the next bit sequence remains continuously at one level.

In a more detailed aspect of the invention, the digital signal means outputs the last bit in each recording sequence for a relatively short time duration after the nominal end of the intermittent frame advancement and further outputs the first bit in each recording sequence for a relatively short time duration before the nominal beginning of the intermittent frame advancement. This ensures that the digital signal is recorded on the film as a continuous signal, without any gaps between the successive bit sequences.

A second embodiment of the invention is specifically adapted for use in recording a digital signal that is suitable for decoding by a playback device that is adapted to detect a continuous digital signal that consists entirely of alternating sets of information bits and synchronization bits. The playback device expects to receive for each picture frame a single set of information bits followed immediately by a single set of synchronization bits. In this second embodiment, the digital signal output by the digital signal means includes, for each frame, a first set of synchronization bits followed immediately by a set of information bits and in turn by a second set of synchronization bits identical to the first set. The conventional playback device therefore properly decodes the information bits for each frame even though there might be superfluous bits or bit dropouts at the beginning and ending of the bit sequence for the frame. In effect, the conventional playback device properly decodes each set of information bits because it is immediately preceded and followed by appropriate synchronization bits, and because it therefore interprets the preceding set of synchronization bits as being associated with the preceding picture frame and the following set of synchronization bits as being associated with the current frame.

The bit sequence recorded for each picture frame can further include a prescribed plurality of bits recorded at the beginning and ending of each frame segment, to ensure that the variability in the specific times at which the frame advancement begins and ends does not interfere with a proper recording of the first and second sets of synchronization bits. Recording these additional bits further ensures that the recorded signal will have the appearance of a continuous digital signal.

In both embodiments of the invention, the transducer means preferably includes a light source and means for modulating the intensity of the light produced by the light source in accordance with the digital signal coupled to it by the digital signal means. This exposes the digital signal in a photosensitive region of the film adjacent one of its edges.

Other aspects and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 2 is a fragmentary view of several frames of the motion picture film of FIG. 1, with an enlargement depicting several bits of the time code signal recorded by a first embodiment of the invention;

FIGS. 4(a) and 4(b) is a schematic diagram comparing the modified SMPTE time code signal recorded by a second embodiment of the invention with a conventional SMPTE time code signal of the prior art;

FIG. 5 is a more detailed block diagram of the time code recording apparatus of FIG. 1;

FIGS. 6(a) through 6(h) are a series of timing diagrams useful in explaining the operation of the recording apparatus of FIG. 5;

FIG. 7 is a cross-sectional view of the LED and associated mask structure of the recording apparatus of FIG. 5;

FIG. 8 is a fragmentary view of an alternative LED structure, this one having a lens for focusing the light beam;

FIG. 9 is a plan view of the mask of FIG. 7, showing its elongated aperture; and FIG. 10 is a simplified flowchart of the process implemented by the microprocessor of FIG. 5.

DESCRIPTION OF THE PREFERRED EMBODIMENT

Figure 1:
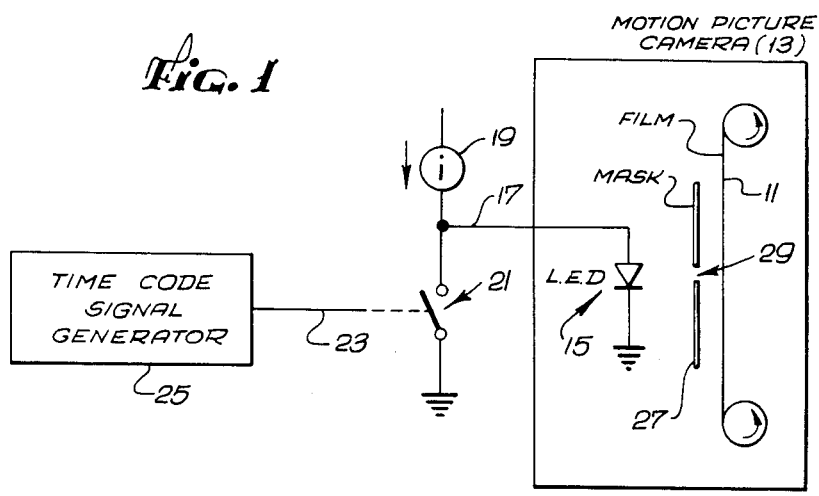
FIG. 1 is a simplified block diagram of apparatus for recording a modified SMPTE time code signal on motion picture film as it is being intermittently advanced by a motion picture camera.

Referring now to the drawings, and particularly to FIG. 1, there is shown an apparatus for recording a special digital time code signal on motion picture film 11 as it is being intermittently advanced a distance of one frame spacing by a motion picture camera 13. The signal is exposed in the film as a succession of digital bits forming a track adjacent one edge of the film using a light-emitting diode (LED) 15. Electrical current for the LED is supplied on line 17 from a current source 19. A switch 21, controlled by a digital signal output on line 23 by a time code signal generator 25, selectively shunts the LED current to ground, to modulate the LED on and off as the camera advances the film. A mask 27 with a narrow aperture 29 confines the light from the LED to a narrow track on the film.

A suitable time code, signal generator 25 is disclosed in a copending and commonly-assigned application for U.S. Patent, Ser. No. 424,841 filed Sept. 27, 1982 in the names of Steven A. Bell et al. and entitled "System for Recording a Time Code Signal on Motion Picture Film." The disclosed generator adjusts the time durations of the successive digital bits it outputs, to compensate for the film's variable velocity profile and thereby record the bits in the film 11 with a substantially uniform time base. A more detailed description of the time code signal generator is provided below, with reference to FIGS. 5–10.

A conventional SMPTE time code signal is depicted schematically in FIG. 4(a). It includes a separate 80-bit word for each picture frame, including 64 information bits followed immediately by 16 synchronization bits. The 64 information bits include 32 bits of timing information and 32 bits of other information that can be selected by the user. The SMPTE time code signal is in a diphase Manchester data format, in which the beginning and ending of each bit is marked by a transition in level, and in which a "one" bit has a transition at its midpoint and a "zero" bit has no such transition at its midpoint.

It is not believed to be feasible to record a conventional SMPTE time code signal on the motion picture film 11 as it is being intermittently advanced by the camera 13, because of small uncertainties in the specific times at which the intermittent frame advancement begins and ends. This could cause the first and last bits in each 80-bit word to be lost or could cause gaps to be formed between the successive 80-bit words. If this occurred, conventional SMPTE playback devices or readers could not properly decode the time code signal.

In accordance with the invention, the time code signal generator 25 outputs a special modified-SMPTE time code signal such that the signal recorded on the film 11 can be properly decoded by a conventional SMPTE time code reader. The signal is specially configured such that the uncertainties in the specific times at which the intermittent frame advancement begins and ends have no effect on the reader's operation.

More particularly, in a first embodiment of the invention, the SMPTE time code signal is modified by beginning and ending each recording sequence on the seventy ninth bit of the 80-bit SMPTE word, and by increasing the nominal duration of that seventy ninth bit. FIG. 2 depicts a portion of the film 11, after it has been developed, showing the time code signal recorded by this embodiment of the invention. It should be observed that all of the successive bits have substantially the same nominal duration, except for the seventy ninth bit, which is approximately 50 percent longer.

The LED 15 is positioned in the motion picture camera 13 such that when the film 11 is stationary it is adjacent a point on the film indicated by the arrow 31 in FIG. 2. When the camera is nominally expected to begin advancing the film by one frame spacing, the time code signal generator 25 outputs one-half of the seventy ninth bit of the 80-bit SMPTE word, followed by the eightieth bit and, in turn, the first 79 bits of the next 80-bit word. Since the seventy ninth bit is the next to last bit of the 16-bit synchronization word, which is always a "zero", no level transition occurs at its midpoint. The LED is displaced relative to the edge of the film's picture frame such that the first bit of each 80-bit word is aligned with the frame edge.

The time code signal generator 25 preferably begins outputting the last portion of the seventy ninth bit a relatively short time before the camera 13 is nominally expected to advance the film 11. Also, the generator continues to output the first portion of the seventy ninth bit a relatively short time after the camera is expected to stop advancing the film. This ensures that, in the worst case, the film will not be moving at a time when the generator is not outputting a signal and thereby prevents a gap from possibly being produced in the middle of the seventy ninth bit.

Driving the LED 15 at times when the film 11 is stationary will overexpose the adjacent portion of the film and likely expose to a slight degree portions of the film just beyond the edge of the mask aperture 29. However, this diffusion will likely be confined to the mid-portion of the seventh ninth bit and will not create any fuzziness in its edges. This overexposure and diffusion of course occurs only for those frames in which the seventy ninth bit is recorded with the LED being on, not off.

The increased length for the seventy ninth bit of each 80-bit word does not affect proper operation of typical SMPTE time code readers. Several suitable readers are a TCR 660 time code reader manufactured by Telcom Research of Burlington, Ontario, Canada, a model 645 portable reader manufactured by Shintron of Cambridge, Mass., and a model 760 time code reader manufactured by Datametrics of Wilmington, Mass.

Figure 3:
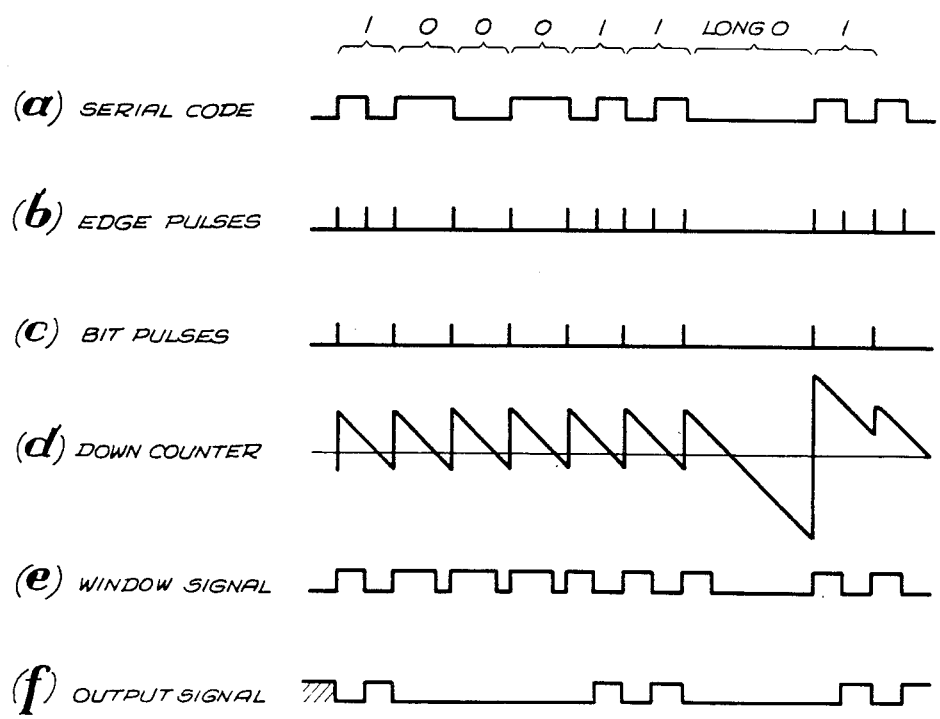
FIGS. 3(a) through 3(f) are a series of timing diagrams useful in explaining how a conventional time code reader decodes a diphase digital signal input to it.

The lack of effect an increased bit length has on these time code readers is illustrated with reference to FIGS. 3(a) through (f). FIG. 3(a) depicts a diphase Manchester time code signal with several "ones" and "zeroes" followed by a "zero" of increased time duration and then by a "one" of normal duration. As previously mentioned, the diphase signal includes transitions in level at the edges of each bit and further includes a transition at the midpoint of each "one" bit and no transition at the midpoint of each "zero" bit.

In decoding the diphase time code signal of FIG. 3(a), a typical SMPTE time code reader first generates a sequence of edge pulses indicating the transitions in the signal's level, as shown in FIG. 3(b). By examining the relative spacings between the successive edge pulses, the reader quickly determines which pulses correspond to the bit edges, as contrasted with bit midpoints, and generates a sequence of bit pulses corresponding to those bit edges, as shown in FIG. 3(c). The reader uses each bit pulse to reset an internal counter to a number proportional to three-fourths of the duration of the last bit, i.e., the time elapsed since the previous bit pulse. With reference to FIG. 3(d), this internal counter is decremented uniformly, ordinarily crossing zero at about three-fourths of a bit time.

A window signal, depicted in FIG. 3(e), changes state at the trailing edge of each edge pulse (FIG. 3(b)) and, additionally, is set to "zero" whenever the counter is decremented across a count of zero (see FIG. 3(d)).

Finally, with reference to FIG. 3(f), the diphase time code signal of FIG. 3(a) is detected by setting an output signal to whatever state the window signal (FIG. 3(e)) is in upon the occurrence of the leading edge of each edge pulse (FIG. 3(b)). It should be observed that the output signal is a logical "one" during the last half bit time of each logical "one" bit and is a logical "zero" at all other times. Also, it should be observed that the increased length for the "zero" bit at the right side of the diagram has no effect on the output signal, i.e., the signal remains in the "zero" state for the entire duration of the bit.

In a second embodiment of the invention, the SMPTE time code signal is modified by adding an additional 16-bit synchronization word immediately preceding the conventional 64-bit information word. Thus, with reference to FIG. 4(b) it should be observed that the modified time code signal recorded for each picture frame includes a first 16-bit synchronization word followed immediately by the conventional 64-bit time code word and, in turn, the conventional 16-bit synchronization word. In decoding the detected signal, a conventional SMPTE time code reader interprets the first 16-bit synchronization word as the synchronization word for the preceding frame and interprets the subsequent 64-bit time code word and 16-bit synchronization word as the complete 80-bit word for the current frame.

Two additional bits are preferably added at both the beginning and the ending of the bit sequence recorded for each frame, making each bit sequence include 100 bits in all. It will of course be appreciated that these additional bits should be specially selected to ensure that the reader is properly synchronized by the time it reaches the data bits. The first and second bits therefore are preferably a "one" and a "zero," respectively, and the ninety ninth and one hundredth bits are therefore preferably a "zero" and a "one," respectively. In addition, a gap greater than three-fourths of a bit length is preferably introduced between successive 100-bit words. This can be accomplished by initiating the recording of the first bit after the nominal time at which the film begins advancing and/or by finishing the recording of the one hundredth bit before the nominal time at which the film stops advancing.

The increase in the number of bits recorded for each frame from 80 to 100 should ordinarily have no effect on operation of typical SMPTE time code readers, since they are normally adapted for use at widely varying film speeds.

The recording apparatus of FIG. 1 will now be described in detail, with particular reference to FIGS. 5–10. As previously mentioned, the digital time code signal is exposed on the film 11 using the light-emitting diode (LED) 15 and the associated mask 27 and aperture 29. Electrical current is coupled to the LED on line 17 from an amplifier 24 (FIG. 5), and a microprocessor 26 outputs a digital time code signal for coupling on line 23 to the switch 21, which either does or does not short the amplifier current to ground. In this fashion, the LED is pulsed on and off in the appropriate manner, to expose a pattern in the film representative of the digital time code signal.

The instantaneous velocity of the motion picture film 11 relative to the LED 15 and mask 27 follows a predetermined variable velocity profile each time it is advanced one frame spacing by the motion picture camera 13. This velocity profile is generally sinusoidal in shape. A schematic representation of the film's velocity for several successive intermittent advancements is shown in FIG. 6(c).

The microprocessor 26 controllably adjusts the time base of the digital time code signal it outputs on line 23 to pulse the LED 15 on and off, so as to compensate for the variable velocity profile of the advancing film 11. This adjusts the lengths of the successively recorded bits to be substantially uniform, notwithstanding the film's non-uniform velocity.

This variable-duration recording is accomplished by the microprocessor 26, a velocity data read-only memory (ROM) 28 and a timer 31. The velocity data ROM stores a plurality of numbers corresponding to the successive time durations required by the camera 13 to advance the film 11 a prescribed distance. In the preferred embodiment, each such number corresponds to the time required to record one half of a bit of the diphase time code signal, which is the minimum time period the LED 15 is in one state or the other, i.e., on or off.

More particularly, the microprocessor 26 includes a CPU 33, a program read-only memory (ROM) 35, a random-access memory (RAM) 37 and an input/output device (I/O) 39. The program ROM stores the program instructions to be implemented by the CPU, the RAM stores the continuously-updated timing information and the user information for inclusion in the time code signal to be recorded, and the I/O appropriately formats the various input and output signals coupled to and from the CPU.

During time periods when the motion picture camera 13 is not turned on, as indicated by an on/off signal it outputs on line 41, the CPU 33 periodically updates the timing information stored in the RAM 37. In particular, it increments the frame number portion of the time code once every 1/24th of a second. This is done even though no actual frames are being exposed by the camera. During periods when the camera is on, on the other hand, the CPU outputs both the time code signal and an address sequence signal. The time code signal is coupled on line 23 to the LED switch 21, and the address sequence signal is coupled on an address bus 43 to the velocity data ROM 28, to appropriately sequence the recording of the digital time code signal on the film 11.

As previously mentioned, the velocity data ROM 28 stores a plurality of numbers indicating the durations of the successive half bit times of the diphase time code signal required to record the signal on the film with a substantially uniform time base. For an 80-bit time code signal, the ROM therefore stores 160 such numbers. The first and last numbers stored represent relatively long durations, since they are addressed when the camera 13 is advancing the film 11 relatively slowly.

When a memory location in the velocity data ROM 28 is first addressed by the address sequence signal, the time duration number it stores is output on lines 45 to the timer 31, for entry into an internal decrementing counter. The timer then begins decrementing the count toward zero at a uniform rate. When the counter reaches zero, the timer outputs a clock pulse for coupling on line 47 to the microprocessor 26 and readies itself for acceptance of the next time duration number from the velocity data ROM. Upon receipt of the clock pulse, the microprocessor immediately addresses the next address location in the velocity data ROM, and the cycle is repeated. After the last of the 160 address locations has been selected, the recording process for the current picture frame has been completed, and the microprocessor returns to its mode of continuously updating the timing information being stored in its internal RAM 37.

The 160 time duration numbers stored in the velocity data ROM 28 are initially input into it based on data compiled in prior testing of the motion picture camera 13, or an identical model. It is anticipated that the variable velocity profile represented by this data will not change substantially over the camera's life.

As previously mentioned, when the motion picture camera 13 is not turned on, the microprocessor 26 continuously updates the timing information it stores in its internal RAM 37. This timing information is incremented at frame times of 24 times per second, or at any selected rate for other, non-standard motion picture formats. An internally-used real-time frame signal, indicating the times at which the microprocessor updates the timing information, is depicted in FIG. 6(a).

When the motion picture camera 13 is turned on, it outputs the on/off signal for coupling on line 41 to the microprocessor 26, and in addition begins outputting a mirror return signal at regular intervals of time (FIG. 6(b)), indicating when the camera's shutter is closed. This signal, which is sometimes called a parking pulse, is ordinarily used by the camera only interally to indicate when the camera should stop advancing the film 11 following disengagement of its shutter release button (not shown). In the apparatus of FIG. 5, however, this mirror return signal is coupled on line 49 to an adjustable delay device 51 for delaying the successive pulses by a selected amount such that each delayed pulse coincides with the nominal start of film advance. The delayed mirror return signal, which is depicted in FIG. 6(d), is coupled on line 53 to the microprocessor, to indicate each time the mircoprocessor should initiate its addressing of the velocity data ROM 28 and thereby initiate recording of the time code signal on the film.

The apparatus delays recording the time code signal on the film 11 until the motion picture camera 13 has reached a stable speed. This ordinarily requires only a few frames. The microprocessor 26 determines when the camera is up to speed by comparing the delayed mirror return signal (FIG. 6(d)) supplied to it on line 53 with its internal real time frame signal (FIG. 6(a)). In particular, the period between two successive pulses of the internal real time frame signal is divided into a number of time segments, e.g., 160. Once two consecutive delayed mirror return pulses occur during the same time segment number of successive frames, the microprocessor determines that the camera is up to speed.

After the motion picture camera 13 is determined to be up to speed, the CPU 33 awaits input of a pulse in the delayed mirror return signal (FIG. 6(d)). As soon as a pulse is detected, the CPU addresses the first of the 160 address locations in the velocity data ROM 28 and simultaneously outputs the first half bit of the time code signal, for coupling on line 23 to the LED switch 21. As previously mentioned, the velocity data ROM outputs an appropriate number to the timer 31, which beings decrementing the number to zero. Once the timer reaches zero, it outputs a clock pulse for coupling on line 47 to the microprocessor 26, which responds by addressing the next memory location in the velocity data ROM and by outputting the next appropriate half bit of the time code signal. This process is repeated until all 160 half bits have been recorded.

The successive bursts of 160 clock pulses from the time 47 for several consecutive picture frames are depicted in FIG. 6(e). FIG. 6(f) depicts the same signal on an expanded scale. It should be observed that the successive pulses are relatively far apart from each other at the beginning and end of the burst, when the film 11 is moving relatively slowly and a longer time duration is required to record a bit of constant length. The 80 bits of the diphase time code signal recorded as a result of the successive clock pulses of FIG. 6(f) are shown in FIG. 6(g).

The apparatus controllably varies the intensity of the beam of light produced by the LED 15 in accordance with the film's instantaneous velocity, so that all 80 bits of the diphase time code signal are exposed in the film 11 by substantially the same degree. Reducing the intensity of the light beam at the beginning and end of each 80 bit time code word reduces the likelihood of exposing portions of the film beyond the extent of the mask aperture 29.

To accomplish this, the microprocessor 26 outputs an appropriate sequence of digital words for coupling on lines 55 to an intensity digital-to-analog converter (D/A) 57, which converts each word to a corresponding analog voltage signal for coupling on line 59 to the amplifier 24. The amplifier, in turn, generates a corresponding current for coupling to the LED 15 on line 17. This current, which is of course representative of the LED's intensity, is depicted in FIG. 6(h). It is selected to equal one of several discrete levels, e.g. eight, each time the film moves in its intermittent fashion. The digital word for each such intensity level is stored in the microprocessor's internal program ROM 35.

FIG. 7 is a cross-sectional view of the LED 15, the mask 27 and their associated support structure. The LED is disposed on a substrate that includes an insulator 61 and a metal case 63 carrying a positive potential. The mask is supported above the LED on a metal case 65 carrying a negative potential. A glass passivation layer 67 is coated on the mask's exposed surface, to reduce wear on the mask caused by film abrasion. In an alternative embodiment, a fragmentary view of which is shown in FIG. 8, the structure further includes a cylindrical lens 69 cemented directly on top of the LED's light-emitting surface. It focuses the light on the mask aperture 29, to increase the system's efficiency.

A plan view of the exposed surface of the mask 26 is shown in FIG. 9 The elongated aperture 29 preferably has a width of about 0.2 mils, and a length of 10 mils when used to record on 16 mm film and 20 mils when used to record on 35 mm film. In use, the mask is positioned immediately adjacent to the motion picture film 11 such that the film slides across the glass passivation layer 67. This reduces the likelihood that light passing thorugh the aperture will diffuse outwardly and insures that the edges of the successive bits are sharply defined. The structure is oriented such that the film is moved in a direction substantially perpendicular to the aperture's longitudinal axis.

With reference now to FIG. 10, there is shown a simplified flowchart of the steps performed by the microprocessor 26 in controlling the time code recording apparatus' operating sequence. In an initial step 71, which is ordinarily performed only when the motion picture camera 13 is off, the microprocessor updates the time code signal being stored in its internal RAM 37. It then determines whether or not the camera is on, at step 73. If the camera is not on, the program returns to the initial step of updating the time code. If the camera is on, on the other hand, the microprocessor determines at step 75 whether or not the camera has reached synchronous speed. If it has not, the program returns to the initial step 71 of updating the time code.

Once it is determined at step 75 that the camera has reached synchronous speed, the microprocessor 26 maintains the correct time code signal stored in its internal RAM 37, at step 77, and determines whether or not the camera 13 is still on, at step 79. If it is not still on, the program returns to the initial step 71 of updating the time code.

On the other hand, if it is determined at step 79 that the camera 13 is still turned on, the microprocessor 26 prepares to accept a delayed mirror return signal, i.e., an interrupt signal, at step 81. In particular, it performs a number of other, conventional steps while awaiting for a narrow window or interval in which the next interrupt pulse is expected to occur. This interval is preferably about 2 bit times in duration. When the interval begins, the microprocessor expects an interrupt pulse to occur, at step 83, and determines whether the interval has expired, at step 85. The microprocessor repeats steps 83 and 85 until it determines that the interval has expired. If an interrupt pulse occurs at any time during the interval, the microprocessor shifts to a special interrupt loop 87 in which it sequentially addresses the 160 address locations in the velocity data ROM 28, while outputting 160 one-half bits of time code data. After this interrupt loop is completed, the microprocessor returns to the point it was at when the interrupt pulse occurred.

Eventually, either after the interrupt loop designated by step 87 is completed or after the interval has expired without the occurrence of an interrupt pulse, it will be determined at step 85 that the interval has expired. The microprocessor 26 then determines at 89 whether or not an interrupt pulse occurred during the interval. If it did, the program returns to the step 77 of updating the correct timing information in the internal RAM 37. On the other hand, if it's determined that an interrupt pulse did not occur during the interval, the program returns to the initial step 71 of updating the internal RAM.

It should be appreciated from the foregoing description that the present invention provides an effective apparatus and related method for recording a special digital time code signal on motion picture film while it is being advanced intermittently by a motion picture camera. The recorded signal can be properly decoded by a conventional SMPTE time code reader as though it were in a conventional SMPTE time code format.

Although the invention has been described in detail with reference to the presently preferred embodiments, it should be understood by those of ordinary skill in the art that various modifications can be made without departing from the invention. Accordingly, the invention is limited only by the following claims.

I claim:

1. Apparatus for recording a continuous digital signal on motion picture film as it is being intermittently advanced a distance of one frame spacing by a motion picture camera, the precise times at which the intermittent frame advancement begins and ends being variable, the apparatus comprising:

transducer means disposed adjacent the film; and
    digital signal means for coupling a prescribed sequence of digital bits to the transducer means whenever the motion picture camera intermittently advances the film, to record the bit sequence on the film;

wherein the digital signal means adjusts the durations of the successive bits in each recording sequence such that the last bit recorded on the film during each sequence has a length longer than the nominal lengths of the remaining bits recorded in the sequence, thereby ensuring that the variability in the precise times at which the intermittent frame advancement begins and ends does not result in the recording of a bit that is shorter than a nominal bit duration.

2. Apparatus as defined in claim 1, wherein the digital signal means couples the last bit in each recording sequence to the transducer means for a prescribed time duration at the beginning of the following recording sequence.

3. Apparatus as defined in claim 2, wherein the digital signal means couples the last bit in each recording sequence to the transducer means for a prescribed time duration at the end of each recording sequence, such that the resulting recorded bit has a nominal length approximately the same as the lengths of the preceding bits, and for a prescribed time duration at the beginning of the following recording sequence, such that the resulting recorded bit has a nominal length approximately one-half the lengths of the bits following it, whereby the composite bit normally appears to have a length about one and one-half times the nominal bit lengths.

4. Apparatus as defined in claim 2, wherein the digital signal means further couples the last bit in each recording sequence to the transducer means for a relatively short time duration after the nominal ending of the intermittent film advancement and for a relatively short duration before the nominal beginning of the intermittent film advancement, to ensure that the digital signal is recorded on the film as a continuous signal.

5. Apparatus as defined in claim 1, wherein:
the film includes a photosensitive region adjacent one of its edges; and
the transducer means includes a light source and means for modulating the intensity of the light produced by the light source in accordance with the successive digital bit sequences coupled to it by the digital signal means, to expose the bits in the photosensitive region of the film as it is being intermittently advanced by the camera.

6. Apparatus as defined in claim 1, wherein:
the successive digital bit sequences coupled to the transducer means by the digital signal means have a diphase format, with the occurrence a level transition in the middle of a bit representing a first logical state and with the lack of occurrence of a level transition in the middle of a bit representing a second logical state; and
the last bit in each recording sequence is always the second logical state.

7. Apparatus as defined in claim 6, wherein the successive digital bit sequences recorded on the film comprise an SMPTE time code, with the seventy ninth bit in each eighty bit sequence being the last bit recorded on the film during each intermittent film advancement.

8. Apparatus for recording a continuous diphase digital signal on motion picture film as it is being intermittently advanced a distance of one frame spacing by a motion picture camera, wherein the film includes a photosensitive region adjacent one of its edges, and wherein the precise times at which the intermittent frame advancement begins and ends are variable, the apparatus comprising:

a light source disposed adjacent the phtosensitive region of the film;
modulating means for modulating the light source on and off; and
digital signal means for coupling a prescribed sequence of digital bits to the modulating means for the duration of the intermittent times the motion picture camera advances the film, to expose the successive bit sequences in the photosensitive region of the film as a continuous signal;
wherein the digital signal means couples the last bit in each recording sequence to the modulating means for a prescribed time duration at the end of each recording sequence, such that the resulting recorded bit has a nominal length approximately the same as the lengths of the preceding bits, and for a prescribed time duration at the beginning of the following recording sequence, such that the resulting recorded bit has a nominal length approximately one-half the lengths of the bits following it, whereby the composite bit normally appears to have a length about one and one-half times the nominal bit lengths;
and wherein the digital signal means further couples the last bit in each recording sequence to the transducer means for a relatively short time duration after the nominal ending of the intermittent film advancement and for a relatively short duration before the nominal beginning of the intermittent film advancement, to ensure that the digital signal is recorded on the film as a continuous signal.

9. A method for recording a continuous digital signal on motion picture film as it is being intermittently advanced a distance of one frame spacing by a motion picture camera, the precise times at which the intermittent frame advancement begins and ends being variable, the method comprising steps of:
positioning a transducer means adjacent the film; and
coupling a prescribed sequence of digital bits to the transducer means whenever the motion picture camera intermittently advances the film, to record the bit sequence on the film;
wherein the step of coupling includes a step of adjusting the durations of the successive bits in each recording sequence such that the last bit recorded on the film during each sequence has a length longer than the nominal lengths of the remaining bits recorded in the sequence, thereby ensuring that the variability in the precise times at which the intermittent frame advancement begins and ends does not result in the recording of a bit that is shorter than a nominal bit duration.

10. A method as defined in claim 9, wherein the step of coupling couples the last bit in each recording sequence to the transducer means for a prescribed time duration at the beginning of the following recording sequence.

11. A method as defined in claim 10, wherein the step of coupling couples the last bit in each recording sequence to the transducer means for a prescribed time duration at the end of each recording sequence, such that the resulting recorded bit has a nominal length approximately the same as the lengths of the preceding bits, and for a prescribed time duration of the following recording sequence, such that the resulting recorded bit has a nominal length approximately one-half the lengths of the bits following it, whereby the composite bit normally appears to have a length about one and one-half times the nominal bit lengths.

12. A method as defined in claim 10, wherein the step of coupling further couples the last bit in each recording sequence to the transducer means for a relatively short time duration after the nominal ending of the intermittent film advancement and for a relatively short duration before the nominal beginning of the intermittent film advancement, to ensure that the igital signal is recorded on the film as a continuous signal.

13. A method as defined in claim 9, wherein:
the film includes a photosensitive region adjacent one of its edges; and
the transducer means includes a light source; and
the method further includes a step of modulating the intensity of the light produced by the light source in accordance with the successive digital bit sequences coupled to it in the step of coupling, to expose the bits in the photosensitive region of the film as it is being intermittently advanced by the camera.

14. A method as defined in claim 9, wherein:
the successive digital bit sequences coupled to the transducer means in the step of coupling have a diphase format, with the occurrence a level transition in the middle of a bit representing a first logical state and with the lack of occurrence of a level transition in the middle of a bit representing a second logical state; and
the last bit in each recording sequence is always the second logical state.

15. A method as defined in claim 14, wherein the successive digital bit sequences recorded on the film comprise an SMPTE time code, with the seventy ninth bit in each eighty bit sequence being the last bit recorded on the film during each intermittent film advancement.

16. Apparatus for recording a digital signal on motion picture film as it is being intermittently advanced a distance of one frame spacing by a motion picture camera, the precise times at which the intermittent frame advancement begins and ends being variable, wherein the recorded signal is suitable for decoding by a playback device adapted to detect a continuous digital signal that for each film frame consists entirely of a single set of information bits followed immediately by a single set of synchronization bits, the apparatus comprising:
transducer means disposed adjacent the film; and
digital signal means for coupling a prescribed sequence of digital bits to the transducer means whenever the motion picture camera intermittently advances the film, to record the bit sequence on the film, the bit sequence associated with each frame including a first set of synchronization bits, followed immediately by a set of information bits and in turn by a second set of synchronization bits identical to the first set, such that the playback device properly decodes the information bits for each frame even though there might be superfluous bits at the beginning and ending of the bit sequence for the frame.

17. Apparatus as defined in claim 16, wherein:
each of the successive bit sequences coupled by the digital signal means further includes a prescribed number of additional bits at its beginning and ending; and
the successive bit sequences recorded on the film appear to be a continuous digital signal, without any dropouts between the bit sequence associated with successive film frames.

18. Apparatus as defined in claim 16, wherein each of the successive bit sequences coupled by the digital signal means is a modified SMPTE time code, the first and second sets of synchronization bits including sixteen bits each and the set of information bits including sixty four bits.

19. Apparatus as defined in claim 18, wherein:
the digital signal recorded on the film is in a diphase Manchester format, in which the beginning and ending of each bit is marked by a transition in level, and in which a one bit has a transition at its midpoint and a zero bit has no such transition at its midpoint;
each of the successive bit sequences coupled by the digital signal means further includes two additional bits at both its beginning and its ending, the two beginning bits being a one followed by a zero and the two ending bits being a zero followed by a one; and
the digital signal means creates a gap between successive bit sequences recorded on the film, the gap having a length greater than three-fourths of a bit length.

20. Apparatus as defined in claim 16, wherein:
the motion picture film includes a photosensitive region adjacent one of its edges; and
the transducer means includes a light source and means for modulating the intensity of the light produced by the light source in accordance with the successive bit sequences coupled to it by the digital signal means, to expose the bit sequences in the photosensitive region adjacent the film edge.

21. Apparatus for recording a continuous digital signal on motion picture film as it is being intermittently advanced a distance of one frame spacing by a motion picture camera, the precise times at which the intermittent frame advancement begins and ends being variable, wherein the film includes a photosensftive region adjacent one of its edges and wherein the recorded signal is suitable for decoding by a playback device adapted to detect a continuous digital signal that for each film frame consists entirely of a single set of information bits followed immediately by a single set of synchronization bits, the apparatus comprising:
a light source disposed adjacent the photosensitive region of the film;
modulating means for modulating the light source on and off; and
digital signal means for coupling a prescribed sequence of digital bits to the modulating means whenever the motion picture camera intermittently advances the film, to expose the successive bit sequences in the photosensitive region of the film;
wherein the bit sequence associated with each frame including a first set of synchronization bits, followed immediately by a set of information bits and in turn by a second set of synchronization bits identical to the first set, such that the playback device properly decodes the information bits for each frame;
and wherein each of the successive bit sequences coupled by the digital signal means further includes a prescribed number of additional bits at its beginning and ending, such that the successive bit sequences recorded on the film appear to be a continuous digital signal, without any dropouts between the bit sequences associated with successive film frames.

22. A method for recording a digital signal on motion picture film as it is being intermittently advanced a distance of one frame spacing by a motion picture camera, the precise times at which the intermittent frame advancement begins and ends being variable, wherein the recorded signal is suitable for decoding by a playback device adapted to detect a continuous digital signal that for each film frame consists entirely of a single set of information bits followed immediately by a single set of synchronization bits, the method comprising steps of:

positioning transducer means adjacent the film; and
coupling a prescribed sequence of digital bits to the transducer means whenever the motion picture camera intermittently advances the film, to record the bit sequence on the film, the bit sequence associated with each frame including a first set of synchronization bits, followed immediately by a set of information bits and in turn by a second set of synchronization bits identical to the first set, such that the playback device properly decodes the information bits for each frame even though there might be superfluous bits at the beginning and ending of the bit sequence for the frame.

23. A method as defined in claim 22 wherein:
each of the successive bit sequences coupled in the step of coupling further includes a prescribed plurality of additional bits at its beginning and ending;
the successive bit sequences recorded on the film appear to be a continuous digital signal, without any dropouts between the bit sequences associated with successive film frames.

24. A method as defined in claim 22, wherein each of the successive bit sequences coupled in the step of coupling is a modified SMPTE time code, the first and second sets of synchronization bits including sixteen bits each and the set of information bits including sixty four bits.

25. Method as defined in claim 24, wherein:
the digital signal recorded on the film is in a diphase Manchester format, in which the beginning and ending of each bit is marked by a transition in level, and in which a one bit has a transition at its midpoint and a zero bit has no such transition at its midpoint;
each of the successive bit sequences coupled in the step of coupling further includes two additional bits at both its beginning and its ending, the two beginning bits being a one followed by a zero and the two ending bits being a zero followed by a one; and
the step of coupling creates a gap between successive bit sequences recorded on the film, the gap having a length greater than three-fourths of a bit length.

26. A method as defined in claim 22, wherein:
the motion picture film includes a photosensitive region adjacent one of its edges;
the transducer means includes a light source; and
the method further includes a step of modulating the intensity of the light produced by the light source in accordance with the successive bit sequences coupled to it by the digital signal means, to expose the bit sequences in the photosensitive region adjacent the film edge.

27. Apparatus for recording a continuous digital signal on motion picture film as it is being intermittently advanced by a motion picture camera, with the precise time at which each intermittent film advancement starts being variable between an earliest start time and a latest start time, and with the precise time at which each intermittent film advancement stops being variable between an earliest stop time and a latest stop time, the apparatus comprising:

transducer means disposed adjacent to the film; and
digital signal means for coupling a prescribed sequence of digital bits to the transducer means whenever the motion picture camera intermittently advances the film, to record the bit sequence on the film;
wherein the digital signal means couples the last bit in each recording sequence for at least as long as the latest stop time and couples the first bit in each recording sequence beginning at least as early as the earliest start time, whereby the apparatus records the successive bit sequences as a continuous signal, without any intervening spaces.

28. Apparatus as defined in claim 27, wherein the last bit in each recording sequence coupled by the digital signal means and the first bit in the next succeeding recording sequence coupled by the digital signal means are always the same.

29. Apparatus as defined in claim 27, wherein:
the digital signal means couples the last bit in each recording sequence beginning a sufficient time before the earliest stop time to ensure that the bit has a recorded length at least as long as a first predetermined minimum value; and
the digital signal means couples the first bit in each recording sequence for a sufficient duration following latest the start time to ensure that the bit has a recorded length at least as long as a second predetermined minimum value.

30. Apparatus as defined in claim 29, wherein:
the last bit in each recording sequence coupled by the digital signal means and the first bit in the next succeeding recording sequence coupled by the digital signal means are always the same; and
the sum of the first and second predetermined minimum length values is at least as long as the nominal length of the remaining recorded bits.

31. A method for recording a continuous digital signal on motion picture film as it is being intermittently advanced by a motion picture camera, with the precise time at which each intermittent film advancement starts being variable between an earliest start time and a latest start time, and with the precise time at which each intermittent film advancement stops being variable between an earliest stop time and a latest stop time, the method comprising steps of:

positioning a transducer means adjacent to the film; and
coupling a prescribed sequence of digital bits to the transducer means whenever the motion picture camera intermittently advances the film, to record the bit sequence on the film;
wherein the step of coupling couples the last bit in each recording sequence for at least as long as the latest stop time and coupling the first bit in each recording sequence beginning at least as early as the earliest start time, whereby the method records the successive bit sequences as a continuous signal, without any intervening spaces.

32. A method as defined in claim 31, wherein the last bit in each recording sequence coupled in the step of coupling and the first bit in the next succeeding recording sequence coupled in the step of coupling are always the same.

33. A method as defined in claim 31, wherein:
the step of coupling includes a step of coupling the last bit in each recording sequence beginning a sufficient time before the earliest stop time to ensure that the bit has a recorded length at least as long as a first predetermined minimum value; and
the step of coupling includes a step of coupling the first bit in each recording sequence for a sufficient duration following the latest start time to ensure that the bit has a recorded length at least as long as a second predetermined minimum value.

34. A method as defined in claim 33, wherein:
the last bit in each recording sequence coupled in the step of coupling and the first bit in the next succeeding recording sequence coupled in the step of coupling are always the same; and
the sum of the first and second predetermined minimum length values is at least as long as the nominal length of the remaining recorded bits.

* * * * *